United States Patent
Lu et al.

(10) Patent No.: US 10,193,754 B2
(45) Date of Patent: Jan. 29, 2019

(54) SYSTEM AND METHOD FOR SUPPORTING CONNECTORS IN A MULTITENANT APPLICATION SERVER ENVIRONMENT

(71) Applicant: Oracle International Corporation, Redwood Shores, CA (US)

(72) Inventors: Guoxiang Lu, Beijing (CN); Dapeng Hu, Beijing (CN); Weijun Tian, Beijing (CN); Sivakumar Thyagarajan, Bangalore (IN); Jagadish Ramu, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 97 days.

(21) Appl. No.: 14/797,827

(22) Filed: Jul. 13, 2015

(65) Prior Publication Data

US 2016/0013983 A1 Jan. 14, 2016

Related U.S. Application Data

(60) Provisional application No. 62/024,369, filed on Jul. 14, 2014, provisional application No. 62/055,343, filed on Sep. 25, 2014.

(51) Int. Cl.
*H04L 12/24* (2006.01)
*G06F 9/50* (2006.01)

(52) U.S. Cl.
CPC ........ *H04L 41/0856* (2013.01); *G06F 9/5077* (2013.01)

(58) Field of Classification Search
CPC ............................ G06F 9/5077; H04L 41/0856
See application file for complete search history.

(56) References Cited

U.S. PATENT DOCUMENTS

| | | | |
|---|---|---|---|
| 8,326,876 B1 | 12/2012 | Venkataraman et al. | |
| 2009/0116380 A1* | 5/2009 | Santiago | H04L 12/5695 370/229 |

(Continued)

FOREIGN PATENT DOCUMENTS

| | | |
|---|---|---|
| CN | 101639835 | 2/2010 |
| CN | 102170457 | 8/2011 |

(Continued)

OTHER PUBLICATIONS

International Search Report and the Written Opinion of the International Searching Report dated Apr. 24, 2015 for PCT/US2015/012268, 10 pages.

(Continued)

*Primary Examiner* — Gil H. Lee
(74) *Attorney, Agent, or Firm* — Tucker Ellis LLP

(57) ABSTRACT

In accordance with an embodiment, described herein is a system and method for supporting the use of connectors in an application server environment. The method can provide, a plurality of deployable resources which can be used within the application server environment, and one or more partitions, wherein each partition provides an administrative and runtime subdivision of the domain. The methods and systems can associate one or more deployed partition-level resource adapters to the one or more partitions, each of the one or more deployed partition-level resource adapters associated with one of the one or more partitions. Finally, the methods and systems can determine, by a connector container, a partition scope of one of the one or more deployed partition-level resource adapters.

16 Claims, 9 Drawing Sheets

(56) References Cited

U.S. PATENT DOCUMENTS

| | | | | |
|---|---|---|---|---|
| 2009/0118839 A1* | 5/2009 | Accapadi | ................ | G06F 21/53 700/28 |
| 2009/0276783 A1* | 11/2009 | Johnson | ................ | G06F 9/5077 718/104 |
| 2011/0213870 A1* | 9/2011 | Cai | ................ | H04L 67/10 709/223 |
| 2012/0072597 A1 | 3/2012 | Teather et al. | | |
| 2012/0110566 A1 | 5/2012 | Park | | |
| 2013/0226985 A1* | 8/2013 | Dixon | ................ | H04L 67/025 709/202 |

FOREIGN PATENT DOCUMENTS

| | | |
|---|---|---|
| CN | 102333115 | 1/2012 |
| CN | 102571821 | 7/2012 |
| CN | 102609271 | 7/2012 |
| CN | 102932404 | 2/2013 |
| CN | 102932405 | 2/2013 |
| CN | 103455512 | 12/2013 |
| CN | 102571916 | 11/2015 |

OTHER PUBLICATIONS

Chinese Patent Office, Office Action dated Jul. 20, 2018, 8 pages.

* cited by examiner

SYSTEM AND METHOD FOR SUPPORTING CONNECTORS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional application titled "SYSTEM AND METHOD FOR SUPPORTING CONNECTORS IN A MULTI-TENANT APPLICATION SERVER ENVIRONMENT", Application No. 62/024,369, filed Jul. 14, 2014, and to U.S. Provisional application titled "SYSTEM AND METHOD FOR SUPPORTING CONNECTORS IN A MULTI-TENANT APPLICATION SERVER ENVIRONMENT", Application No. 62/055,343, filed Sep. 25, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting the use of connectors in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for supporting the use of connectors in an application server environment. The method can provide, a plurality of deployable resources which can be used within the application server environment, and one or more partitions, wherein each partition provides an administrative and runtime subdivision of the domain. The methods and systems can associate one or more deployed partition-level resource adapters to the one or more partitions, each of the one or more deployed partition-level resource adapters associated with one of the one or more partitions. Finally, the methods and systems can determine, by a connector container, a partition scope of one of the one or more deployed partition-level resource adapters.

DETAILED DESCRIPTION

In accordance with an embodiment, described herein is a system and method for supporting the use of connectors in an application server environment. The method can provide, a plurality of deployable resources which can be used within the application server environment, and one or more partitions, wherein each partition provides an administrative and runtime subdivision of the domain. The methods and systems can associate one or more deployed partition-level resource adapters to the one or more partitions, each of the one or more deployed partition-level resource adapters associated with one of the one or more partitions. Finally, the methods and systems can determine, by a connector container, a partition scope of one of the one or more deployed partition-level resource adapters.

Application Server (e.g., Multi-Tenant, MT) Environment

Figure 1:
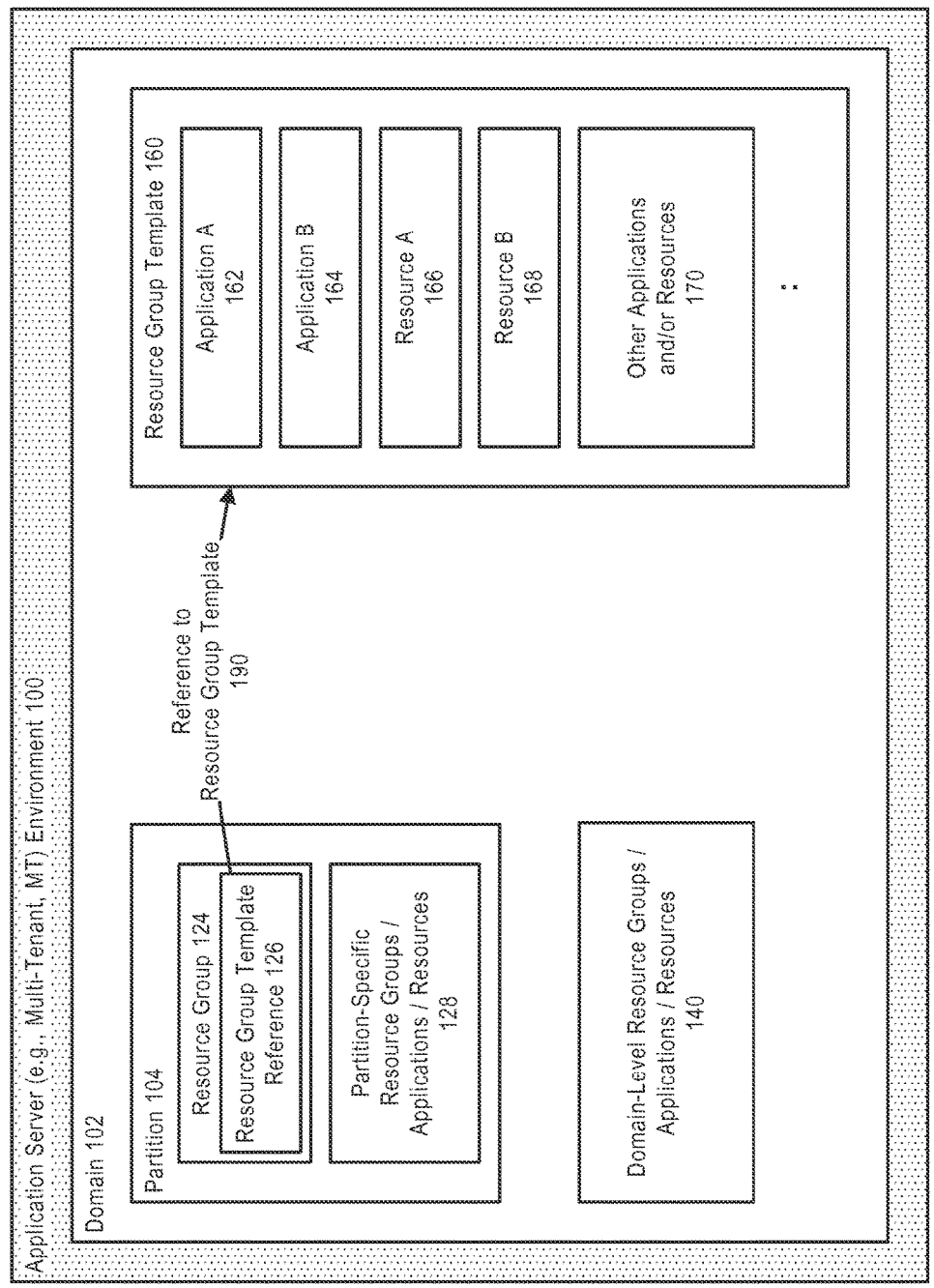
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
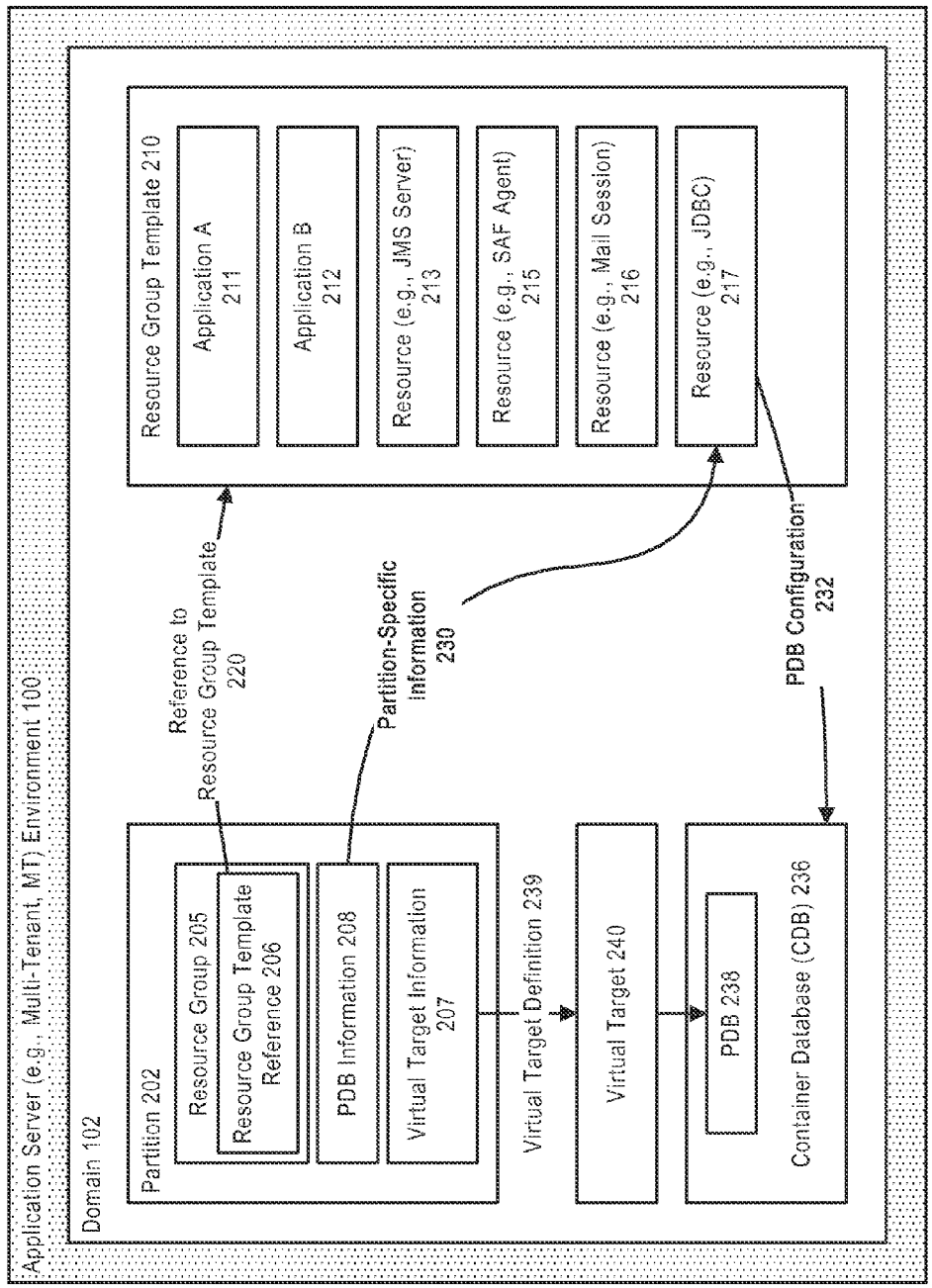
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
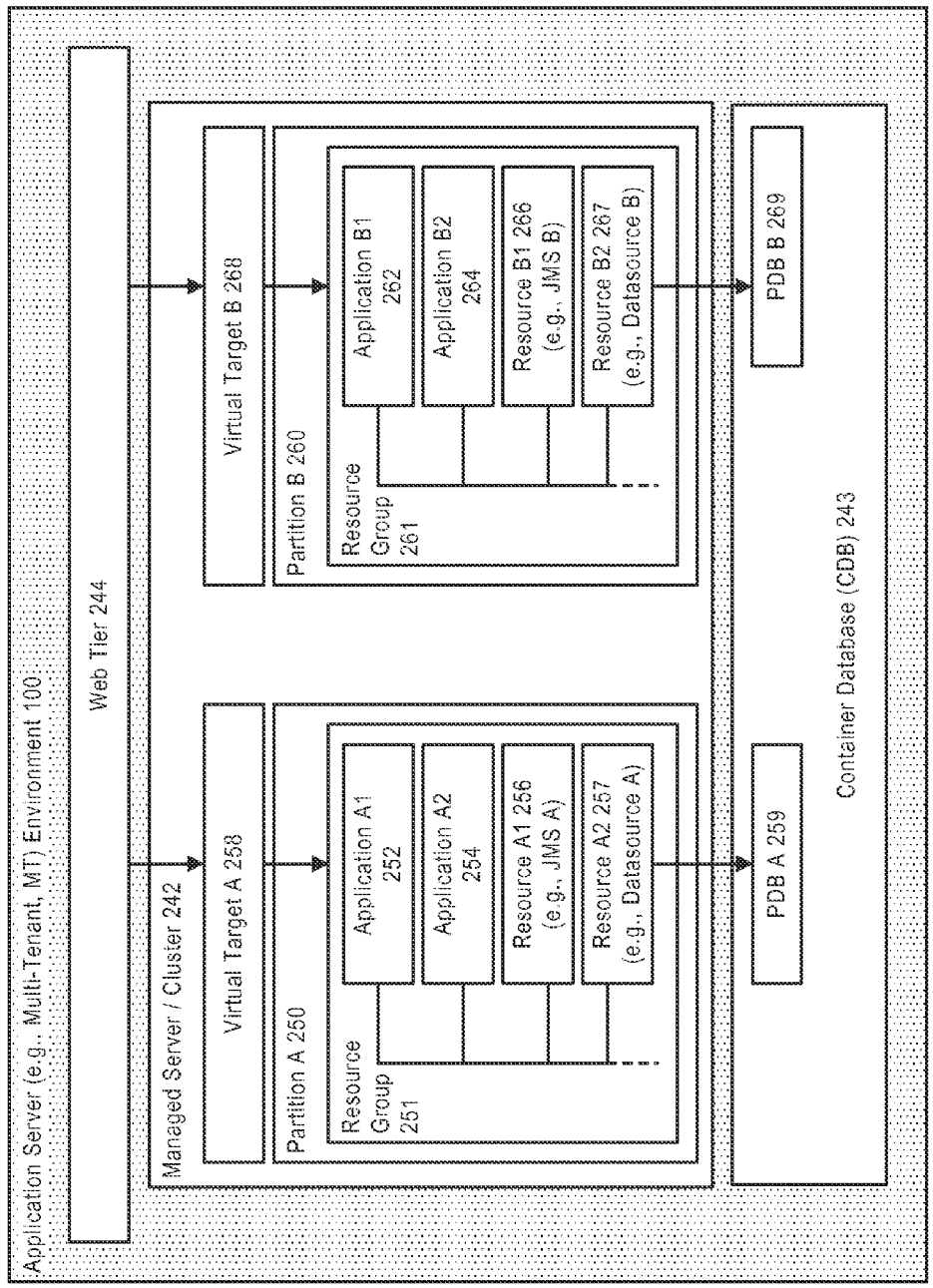
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
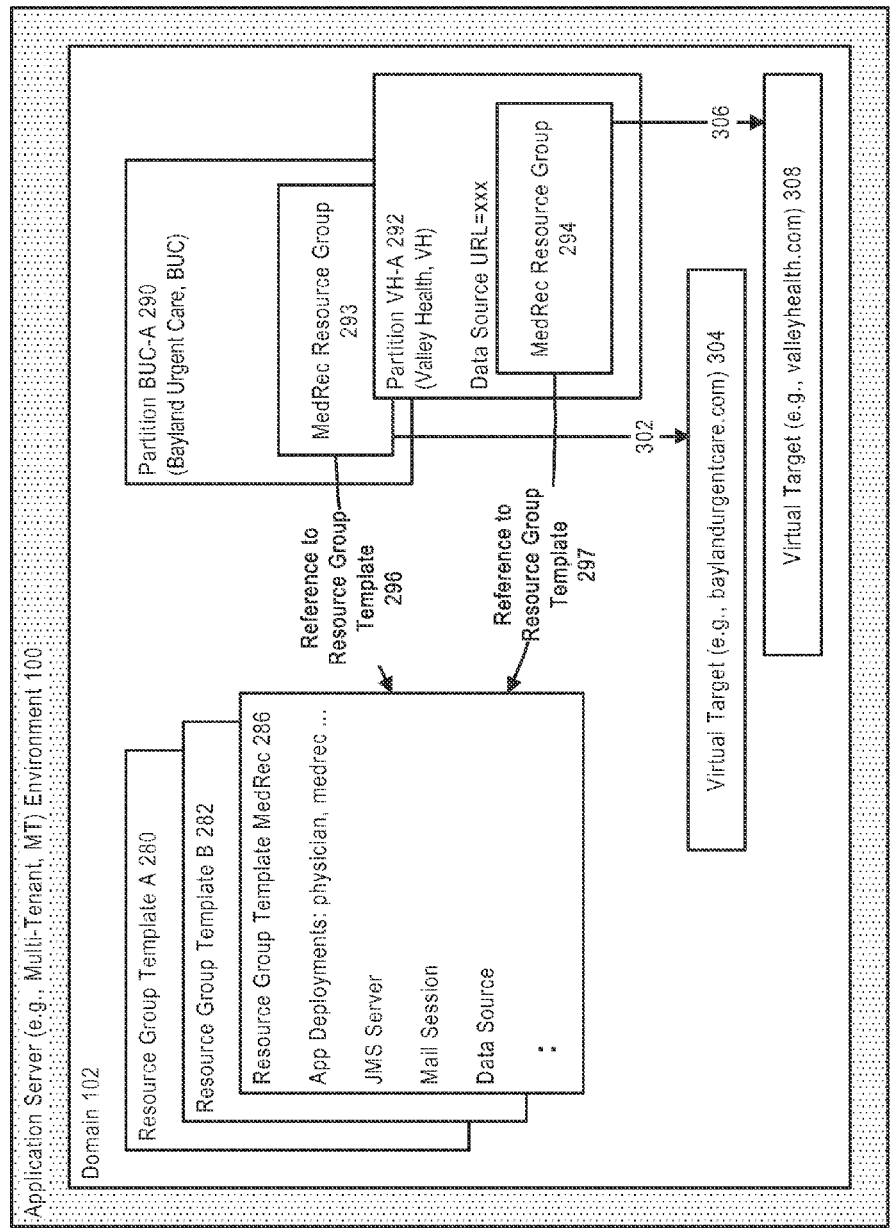
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
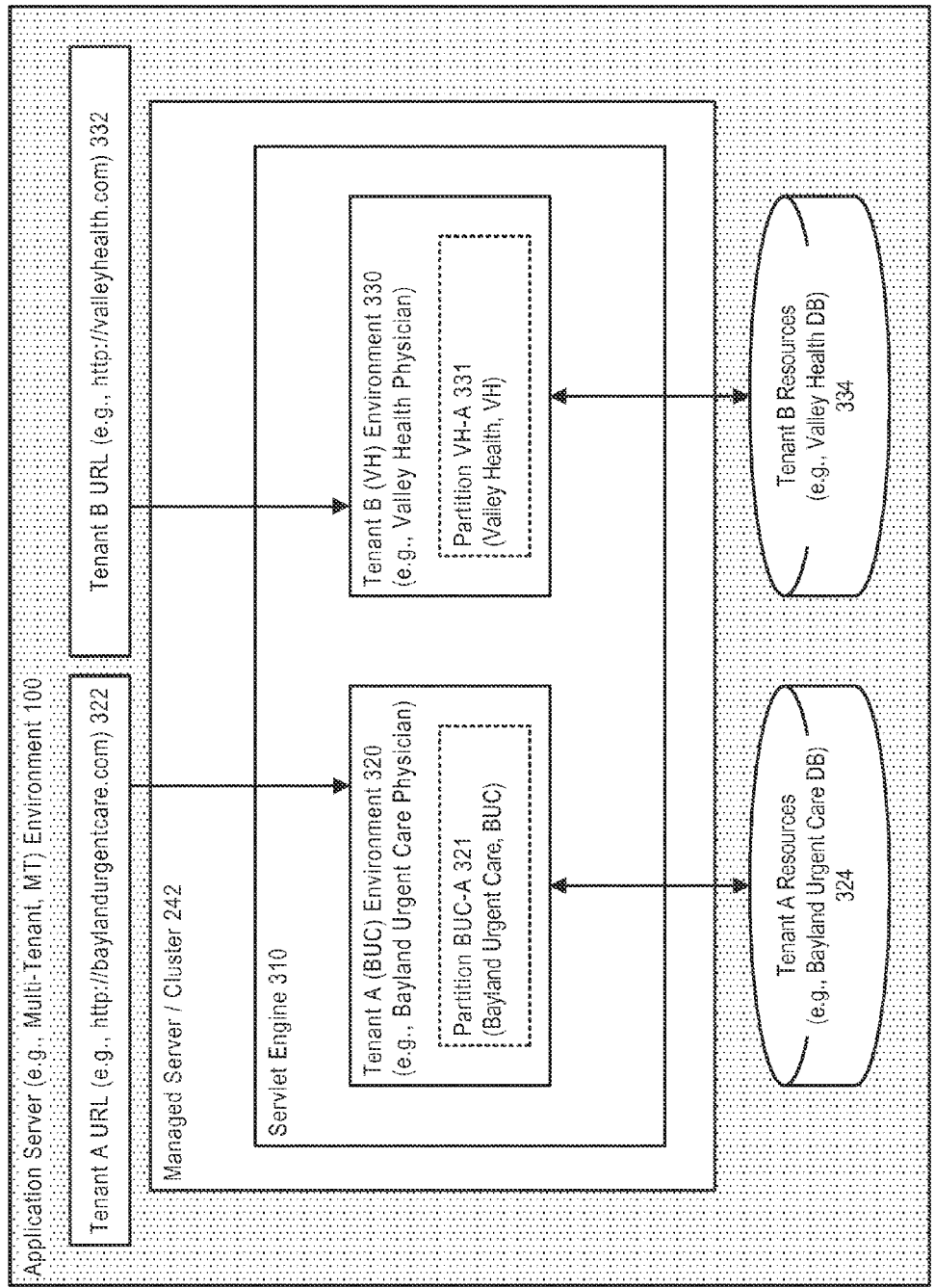
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Support for Connectors—Resource Adapters

In accordance with an embodiment, resource adapters can be provided. In certain embodiments, various resource adapters can be deployed and/or instantiated as a result of a partition-level resource group referencing a domain-level resource group template. In certain embodiments, various resource adapters can be deployed and/or instantiated directly into a partition's resource group and/or as a domain-level resource adapter.

Support for Connectors—Standalone Resource Adapters

In accordance with an embodiment, a system and method can provide support for connectors within a multitenant application server environment. Standalone resource adapters can be deployed in a partition. Access to the services provided by such deployed resource adapters can be limited to those applications in the same partition as the deployed resource adapter.

In accordance with an embodiment, standalone resource adapters can be deployed in a domain. Access to the services and resources provided by a standalone resource adapter that has been deployed to a domain can be limited to those applications within the same domain as the deployed resource adapter. Such standalone resource adapters can be visible at the domain level. Resources and classes of such resource adapters can be visible to applications deployed at the domain level. Classes of such resource adapters may be made visible to partitions by, for example, a system administrator explicitly granting permission/access to such a resource adapter.

In accordance with an embodiment, standalone resource adapters can be deployed in a partition through resource group and resource group template. Resources, such as connection pool, admin-objects, and the like are registered in the partition's JNDI name space. So only those applications in the same partition can access the services provided by the resource adapter. Partition level applications can access domain level resource adapters, which allows domain level resources to be shared by multiple partitions.

Figure 6:
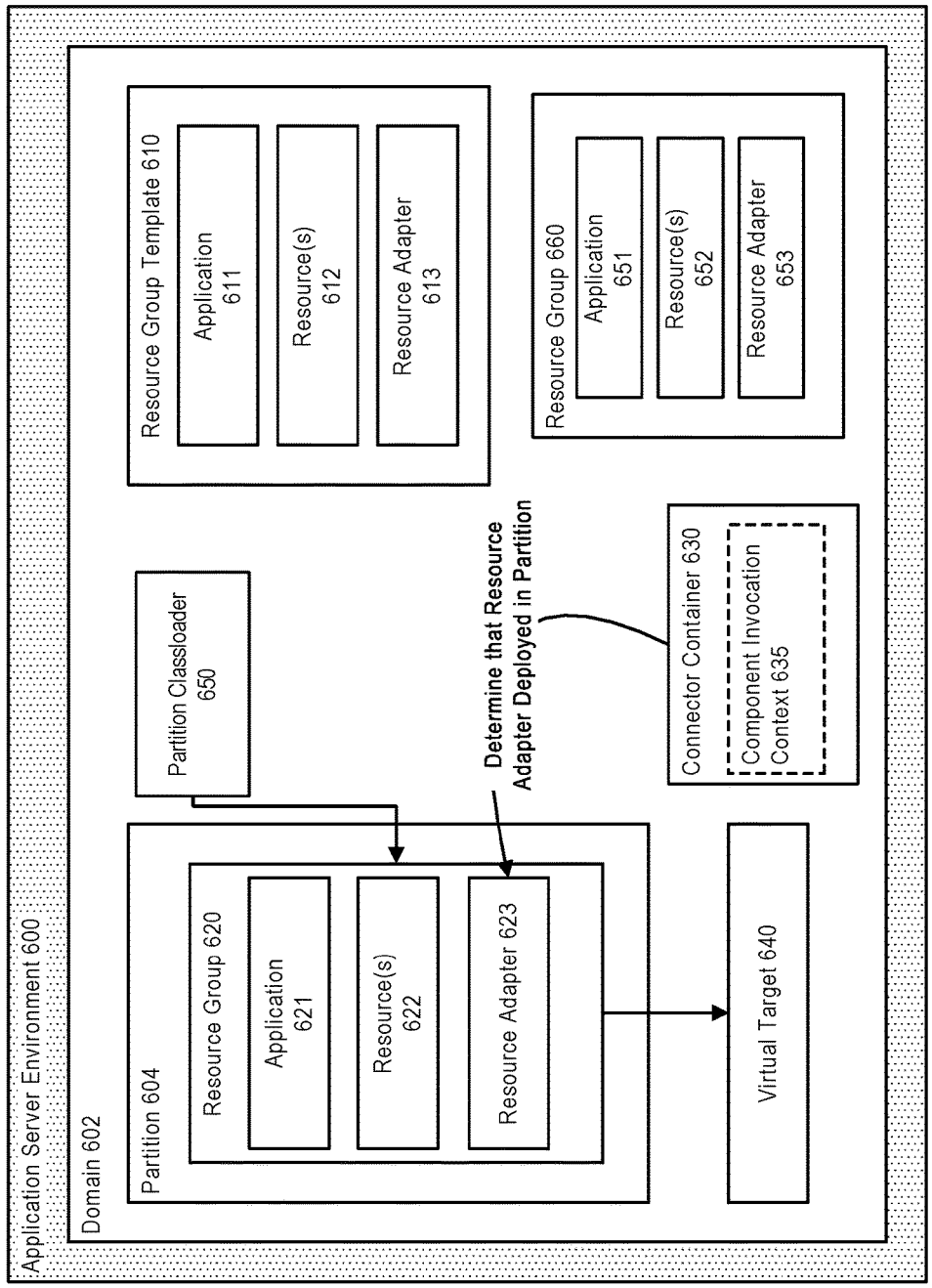
FIG. 6 illustrates support for connectors in an application server environment, in accordance with an embodiment.

FIG. 6 illustrates support for connectors in an application server environment, in accordance with an embodiment. FIG. 6 depicts an application server environment 600 that contains a domain 602. The domain 602 in turn contains at least one partition 604, a virtual target 640, resource group template 610, connector container 630, partition classloader

650, and a domain-level resource group 660. The partition 604 can contain a resource group 620 which can contain an application 621, resources 622, and a resource adapter 623.

In accordance with an embodiment, which can be considered a SaaS use case, application 621, resource(s) 622, and resource adapter 623 can optionally be deployed and/or instantiated as a result of the resource group 620 within the partition 604 referencing the resource group template 610. In such a situation, the resources 622 and resource adapter 623 can be created and/or loaded using the partition classloader 650. When a resource adapter is deployed and/or instantiated within a partition's resource group after the partition references a resource group template 610 within the domain 602, the resource adapter is referred to as a standalone resource adapter.

In accordance with an embodiment, a standalone resource adapter 613 can be first deployed at a domain level within a resource group template 610, which can be created and/or defined by a system administrator. The resource group template can further include an application 611 as well as resource(s) 612. After a resource group within a partition references the resource group template defined by the system administrator, the resulting resource adapter that is deployed/instantiated within the partition's resource group is a standalone resource adapter. A deployed/instantiated resource adapter within a partition can be a runtime instance of a resource adapter within a resource group template that is scoped to the partition within which the resource adapter was deployed/instantiated.

In accordance with an embodiment, once a standalone resource adapter, e.g., resource adapter 623, has been deployed in a partition's resource group, the connector container 630 can determine, by referencing the component invocation context 635, the partition ID of the partition within which the resource adapter is deployed. By first determining and then linking the deployed, standalone resource adapter to the partition ID of the partition within which the resource adapter is deployed, this can allow for the standalone resource adapter to be accessed/utilized by only applications in the partition within which the resource adapter is deployed.

For example, there are two partitions within a domain, a Bayland Urgent Care partition, and a Valley Health partition, and a defined resource group template named MedRecResourceTemplate, which defines an application called MedRec. When a partition within the Bayland Urgent Care partition references the MedRecResourceTemplate, the corresponding resources, application and resource adapter are deployed within the Bayland Urgent Care partition. The resource adapter deployed within the Bayland Urgent Care partition will be a standalone resource adapter, and it will be only be accessible to those applications within the Bayland Urgent Care partition, such as the deployed MedRec application.

Continuing with the above example, a standalone resource adapter can be defined in the domain-level resource group template. Each of the two partitions, Bayland Urgent Care and Valley Health, can define a resource group that inherits the applications and resources from domain-level resource group template. Each partition will have deployed within it its own standalone resource adapter. What follows is an example config.xlm for a SaaS use case:

```
<domain>
    <resource-group-template>
        <name>MedRecResourceTemplate</name>
```

-continued

```
        <app-deployment>
            <name>mailra</name>
            <module-type>rar</module-type>
            <source-path>/some/directory/mail-
connector.rar</source-path>
            <deployment-order>120</ deployment-order >
            <plan-path>${MAILRA-PLAN-FILE}</plan-path>
            ...
        </app-deployment>
        ...
    </resource-group-template>
    <partition>
        <name>BaylandUrgentCare</name>
        <resource-group>
            <name>BayLandMedRec</name>
            <resource-group-template>MedRecResourceTemplate
            </resource-group-template>
        </resource-group>
        ...
    </partition>
    <partition>
        <name>ValleyHealth</name>
        <resource-group>
            <name>ValleyHealthMedRec</name>
            <resource-group-template>MedRecResourceTemplate
            </resource-group-template>
        </resource-group>
        ...
    </partition>
</domain>
```

In accordance with an embodiment, a standalone resource adapter can also be deployed into a domain-level resource group. For example, domain-level resource group 660 can contain domain-level application 651, domain-level resource(s) 652, and domain-level resource adapter 653. Because domain-level resource adapter 653 is a standalone resource adapter, its scope is limited so as to be visible only to applications within the domain, including those applications within partitions contained in the same domain.

Support for Connectors—Embedded Resource Adapters

In accordance with an embodiment, a system and method can provide support for connectors within a multitenant application server environment. Embedded resource adapters can be deployed in a partition in associated with an application the embedded resource adapter is bundled with. Access to the services provided by such deployed resource adapters can be limited to the application with which the embedded resource adapter was deployed with. Embedded resource adapters and their resources may be made visible to other applications within the partition by, for example, an administrator explicitly granting permission/access to such a resource adapter.

In accordance with an embodiment, embedded resource adapters can be directly deployed into partitions in a multipartition or multi-tenant domain without reconfiguration of the embedded resource adapters. Embedded resource adapters can be scoped to an associated application. Access to the services provided by an embedded resource adapter that has been deployed to a partition can be limited to the application the embedded resource adapter is bundled with. Such embedded resource adapters and their resources may be made visible to other applications within the partition by, for example, an administrator explicitly granting permission/ access to such a resource adapter.

In accordance with an embodiment, embedded resource adapters can be deployed in a partition by a partition administrator or a system administrator. All resources, such as RA bean, connection pool, admin-objects are registered in the partition's JNDI name space. If a system administrator grants access to other applications within the partition to access the resource adapter and its resources, only those applications in the same partition can access the services provided by the resource adapter. Partition level applications can, if access has been granted, access domain level resource adapters, which allows domain level resources to be shared by multiple partitions.

Figure 7:
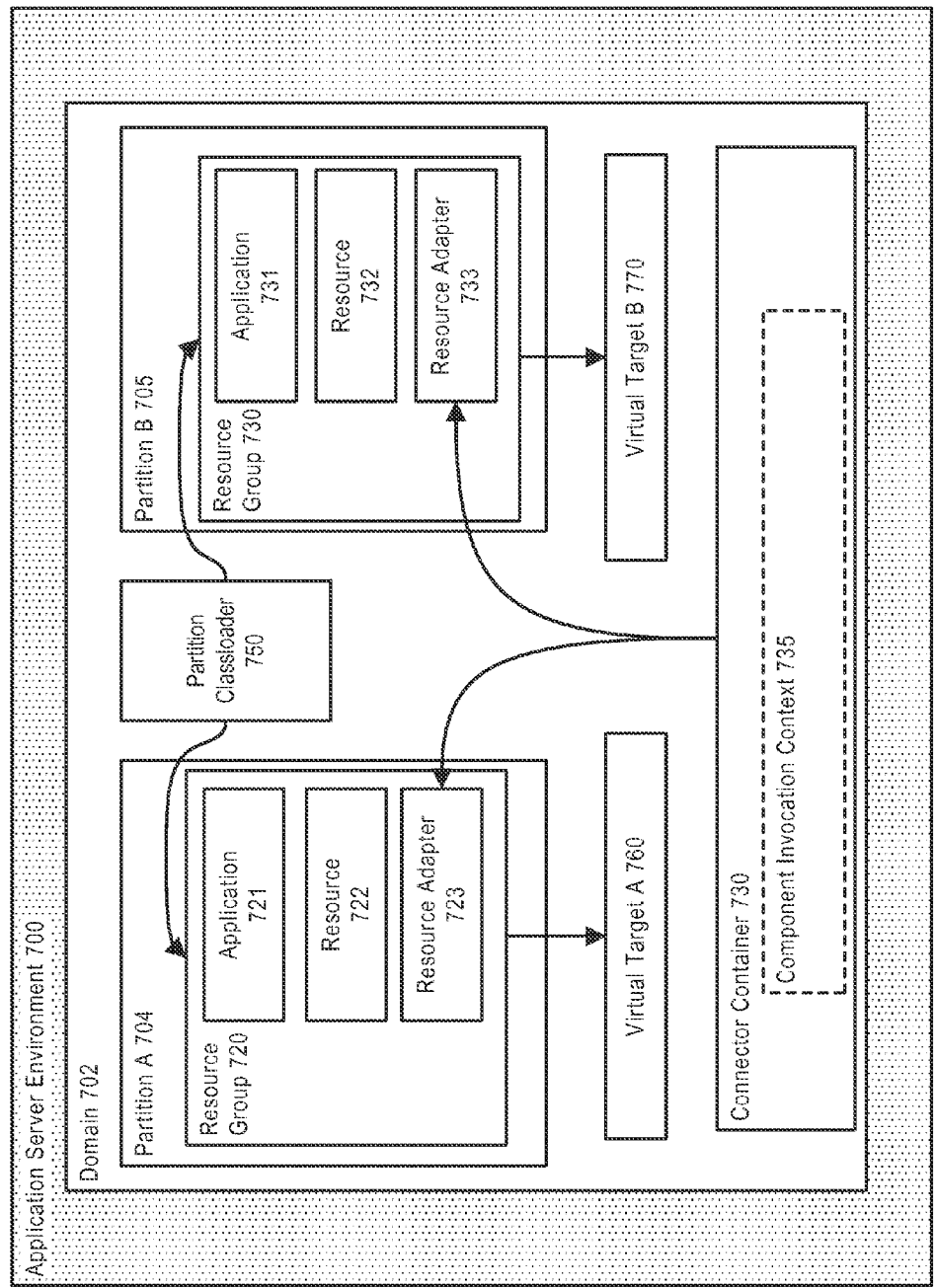
FIG. 7 illustrates support for connectors in an application server environment, in accordance with an embodiment.

FIG. 7 illustrates support for connectors in an application server environment, in accordance with an embodiment. FIG. 7 depicts an application server environment 700 that contains a domain 702. The domain 702 in turn contains partition A 704 and partition B 705, a virtual targets A and B 760 and 770 (respectively associated with resource groups of partition A and partition B), connector container 730, and partition classloader 750. Partition A 704 can contain resource group resource group 720 which can contain an application 721, resources 722, and a resource adapter 723. Partition B 705 can contain resource group resource group 730 which can contain an application 731, resources 732, and a resource adapter 733.

In accordance with an embodiment, which can be considered a consolidation use case, applications 721 and 731, resource(s) 722 and 732, and resource adapters 723 and 733 can be deployed/instantiated, via the partition classloader 750, by partition administrators associated with partitions A and B. In such an embodiment, resource adapters 723 and 733 are considered to be embedded resource adapters. This allows for pre-existing applications and their resource adapters to be deployed/instantiated to partitions within a multi-tenant application server environment without revision or re-writing of the applications or their resource adapters.

In accordance with an embodiment, on deployment of the resource adapters 723 and 733 resources 722 and 732 can be created and/or loaded using the partition classloader 750

In accordance with an embodiment, once an embedded resource adapter, e.g., resource adapter 723 or 733, has been deployed in a partition's resource group, the connector container 730 can determine, by referencing the component invocation context 735, the partition ID of the partition within which the resource adapter is deployed. By first determining and then linking the deployed, embedded resource adapter to the partition ID of the partition within which the resource adapter is deployed, this can allow for the embedded resource adapter to be accessed/utilized by only applications in the partition within which the resource adapter is deployed.

For example, there are two partitions within a domain, a Finance partition, and an HR partition. An administrator, either a system administrator or a HR partition administrator can deploy to the HR partition an application called HR Apps and Resources, along with an associated resource adapter. As deployed resource adapter is then scoped to the HR partition, applications and resources within the Finance partition are unable to access or utilize the deployed resource adapter within the HR partition.

Continuing with the above example, which can be considered a Consolidation use case, the two partitions HR and Finance are defined within the domain. The HR partition has a resource group that defines a resource adapter. As the deployed resource adapter is deployed in the HR partition, it is invisible to the Finance partition. Here is an example config.xml for a consolidation use case:

```
<domain>
    <partition>
        <name>HR</name>
        <resource-group>
            <name>HR Apps and Resources</name>
            <app-deployment>
                <name>mailra</name>
                <module-type>rar</module-type>
                <source-path>/some/directory/mail-
                connector.rar</source-path>
                <deployment-order>120</ deployment-order >
                ...
            </app-deployment>
            ...
        </resource-group>
    </partition>
    <partition>
        <name>Finance</name>
        ...
    </partition>
</domain>
```

Supporting Resource Adapters

Figure 8:
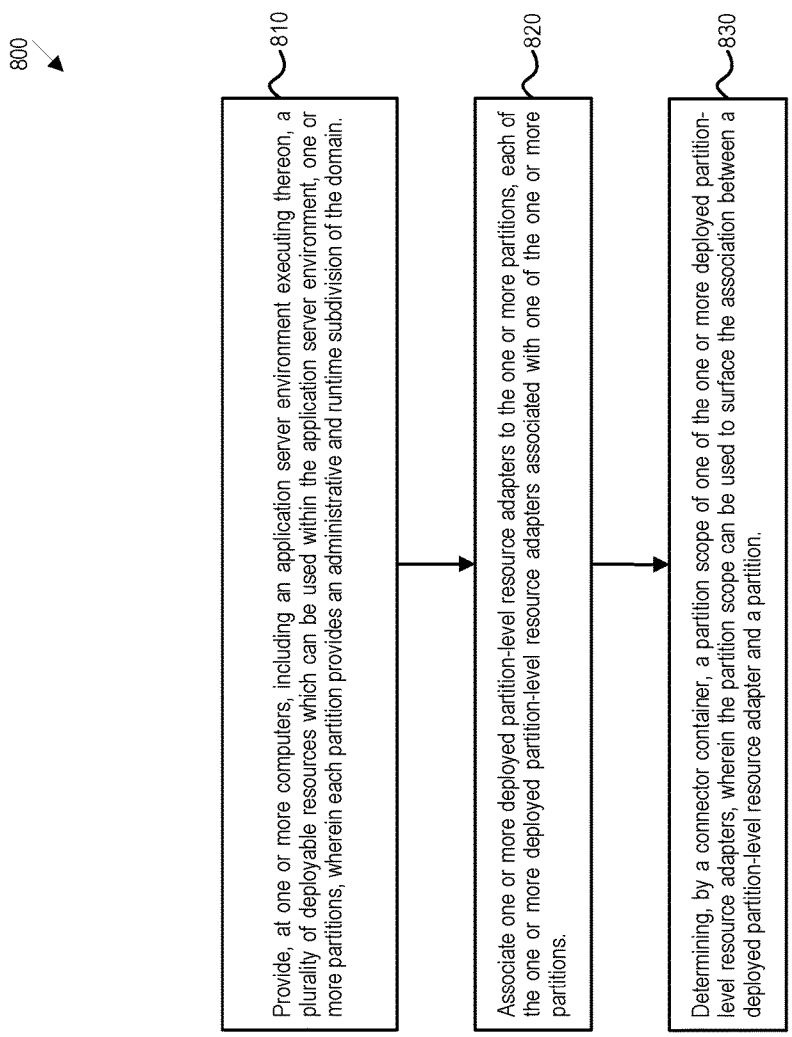
FIG. 8 is a flow chart of an exemplary method for supporting resource adapters in an application server environment.

Referring now to FIG. 8, which is a flow chart of an exemplary method for supporting resource adapters in an application server environment. The exemplary method 800 begins at step 810 with providing, at one or more computers, including an application server environment executing thereon, a plurality of deployable resources which can be used within the application server environment, one or more partitions, wherein each partition provides an administrative and runtime subdivision of the domain. The method can continue at step 820 with associating one or more deployed partition-level resource adapters to the one or more partitions, each of the one or more deployed partition-level resource adapters associated with one of the one or more partitions. The method can conclude at step 830 with determining, by a connector container, a partition scope of one of the one or more deployed partition-level resource adapters, wherein the partition scope can be used to surface the association between a deployed partition-level resource adapter and a partition.

Figure 9:
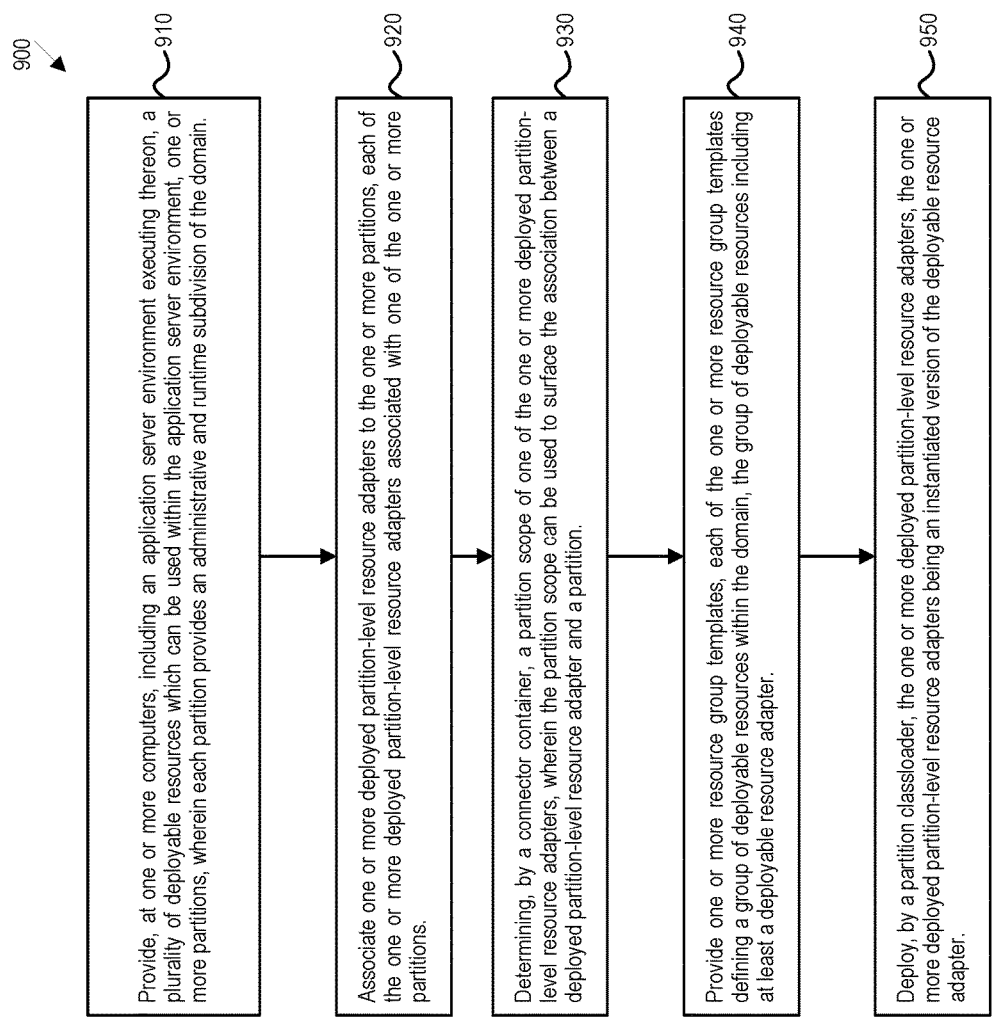
FIG. 9 is a flow chart of an exemplary method for supporting resource adapters in an application server environment.

Referring now to FIG. 9, which is a flow chart of an exemplary method for supporting resource adapters in an application server environment. The exemplary method 900 begins at step 910 with providing, at one or more computers, including an application server environment executing thereon, a plurality of deployable resources which can be used within the application server environment, one or more partitions, wherein each partition provides an administrative and runtime subdivision of the domain. The method can continue at step 920 with associating one or more deployed partition-level resource adapters to the one or more partitions, each of the one or more deployed partition-level resource adapters associated with one of the one or more partitions. The method continues at step 930 with determining, by a connector container, a partition scope of one of the one or more deployed partition-level resource adapters, wherein the partition scope can be used to surface the association between a deployed partition-level resource adapter and a partition. The method proceeds at step 940 with providing one or more resource group templates, each of the one or more resource group templates defining a group of deployable resources within the domain, the group of deployable resources including at least a deployable resource adapter. Finally, the method concludes at step 950 with deploying, by a partition classloader, the one or more deployed partition-level resource adapters, the one or more deployed partition-level resource adapters being an instantiated version of the deployable resource adapter.

Partition Identification

In accordance with an embodiment, when a resource adapter is deployed, the connector container can determine whether the resource adapter is deployed in a partition scope. If the connector container determines that a resource adapter is deployed in a partition, then the connector container can also get the partition ID from the component invocation context. The connector container can use the partition ID while handling partition-related logic, such as authentication against partition's realm, or writing log information. The connector container can also enhance its internal data structure to identify a resource adapter through the combination of RA bean's JNDI name and partition ID.

Resource Deployment

In accordance with an embodiment, if a resource adapter is deployed in partition scope, its resources, such as its RABean, Connection Pools, and Administered Objects are registered in the partition's JNDI name space. Because the resource adapter is deployed in a partition, these resources are only visible to those applications deployed in the same partition scope. If a resource adapter is deployed in a domain-level resource group, all of its resources, such as RABean, Connection Pools, and Administered Objects are registered in the global JNDI name space. These resources will then be visible to all applications no matter which partition it is deployed in, so long as the partition is contained in the domain in which the resource adapter is deployed.

Classloader for Partition Level Resource Adapters

In accordance with an embodiment, a domain classloader can be used as the parent of the application class loader for any application/resource group directly deployed to a domain. A boolean configuration can be added, <share-classes-across-partitions>, to, for example, a webloigc-ra.xml, and this boolean can have its default set to false.

When the boolean <share-classes-across-partitions> is set to false, the class loader behavior for loading a partition resource adapter classes is the same as with loading domain level resource adapter classes.

If an embedded resource adapter is deployed in a partition, its classes are loaded by its containing application's classloader by default. However if <enable-global-access-to-classes> is set to true, resource adapters deployed to a partition can be loaded by partition-scoped classloader, just as standalone resource adapter.

Administration of Partition Level Resource Adapters

In accordance with an embodiment, the application server (e.g., WLS) can add a partition-specific branch PartitionRuntimeMBean for each partition to the ServerRuntimeMBean. PartitionRuntimeMBean can contain ConnectorServiceRuntimeMBean for the resource adapters of the partition. The ConnectorServiceRuntimeMBean has a similar hierarchy for resources to that currently present in the ServerRuntimeMBean. This allows for partition-specific monitoring and statistics. The following shows an exemplary hierarchy of Connector's RuntimeMBeans of both domain and partition level.

```
ServerRuntimeMBean
    ConnectorServiceRuntimeMBean // domain level RuntimeMBeans
    for connector
        ConnectorComponentRuntimeMbeans
            ConnectorConnectionPoolRuntimeMBean
                ConnectorConnectionRuntimeMBean
            ConnectorInboundRuntimeMBean
            WorkManagerRuntimeMBean
            ConnectorWorkManagerRuntimeMBean
PartitionRuntimeMbeans
    ConnectorServiceRuntimeMBean // partition-level RuntimeMBeans
    for connector
        ConnectorComponentRuntimeMbeans
            ConnectorConnectionPoolRuntimeMBean
                ConnectorConnectionRuntimeMBean
            ConnectorInboundRuntimeMBean
            WorkManagerRuntimeMBean
            ConnectorWorkManagerRuntimeMBean
```

Overriding Application Configuration for a Partition

In accordance with an embodiment, a deployment plan file can be specified at application level via the plan-path attribute of the AppDeploymentConfigMBean to override a resource adapter's configuration. When a resource group of a partition references a resource adapter or a resource group template, it can override the resource group configuration via macro substitution for the specified deployment plan at application level. The following example shows a resource-group-template with a macro for the deployment plan file name. There are two partitions, one for Bayland Urgent Care and one for Valley Health.

```
<domain>
    <resource-group-template>
        <name>MedRecResourceTemplate</name>
        <app-deployment>
            <name>mailra</name>
                <name>mailra</name>
                <module-type>rar</module-type>
                <source-path>/some/directory/mail-
                connector.rar</source-path>
                <deployment-order>120</ deployment-order >
        <plan-path>${MAILRA-PLAN-FILE}</plan-path>
    </app-deployment>
    ...
</resource-group-template>
<partition>
    <name>BaylandUrgentCare</name>
    <resource-group>
        <name>BayLandMedRec</name>
        <resource-group-template>MedRecResourceTemplate</resource-group-template>
    </resource-group>
    <partition-properties>
        <partition-property>
            <name>MAILRA-PLAN-FILE</name>
            <value>/apps/plans/bayland/mailra-plan.xml</value>
        </partition-property>
    </partition-properties>
    ...
</partition>
<partition>
    <name>ValleyHealth</name>
    <resource-group>
        <name>ValleyHealthMedRec</name>
        <resource-group-template>MedRecResourceTemplate</resource-group-template>
    </resource-group>
    <partition-properties>
        <partition-property>
            <name>MAILRA-PLAN-FILE</name>
            <value>/apps/plans/valley/mailra-plan.xml</value>
        </partition-property>
    </partition-properties>
    ...
</partition>
</domain>
```

Integration with Diagnostics/Logging

In accordance with an embodiment, a resource adapter writes logs into server and domain log file and connection pool's log file. In a multi-tenant environment, this can be used to identify log records which were generated in the context of a partition. A "Supplemental Attribute" field can be introduced in the server and domain log records by the application servers (e.g., WLS) logging framework. This field can be a list of comma-separated name/value pairs. When a log record is generated in the context of a partition, its partition-id will be recorded in the supplemental attribute, which will be of the form: PARTITION=partition-id. If necessary the connector container should provide the partition ID for Logging framework.

In accordance with an embodiment, the attribute exclude_partitioned for a connector server can be turned on. When the value attribute is set to true, error messages related to the connector service are not accessible to a partition administrator. When the value of exclude_partitioned is set to false, error messages related to the connector service are accessible to partition administrators.

In accordance with an embodiment, a connection pool log can be provided, which can be associated with the following rules. If a log-filename is an absolute path, then the system will use the absolute path. If the log-filename is relative path, and connection pool is created for a partition, the log will be put under the path <domain-root>/partitions/<partition-name>/system/servers/<server-name>/logs. If the log-filename is relative path, and connection pool is created for domain, the log will be put under <domain-root>.

In accordance with an embodiment, if a connection pool is created for a partition, then its log file should be saved under partition-specific directory. In order to avoid concurrent access to the same log file when multiple partitions share the same file location, partition-name should be encoded in connection pool log file name. If the log file provides partition isolation, each record in log file will not be tagged with partition information.

In accordance with an embodiment, the present system and method can provide for enhancement on weblogic.connector.external.RAUtil. The WebLogic Diagnostic Framework (WLDF) uses weblogic.connector.external.RAUtil to identify list of connector log (logical) names and their respective paths. In order to comply with WLDF's requirements, the following methods to get connector log information per partition can be implement. The old version of getAvailableConnectorLogNames( ) will return all connector logs: public static Set<String> getAvailableConnectorLogNames(String partitionId); public static String getLogFileName(String partitionId, String key); and public static String getLogFileRotationDir(String partitionId, String key).

Integration with WorkManager

In accordance with an embodiment, partition administrators can optionally overwrite "global" work manager configuration for their own partitions. Each application within that partition would then be given an instance of the work manager that are created using the partition-specific configuration. If a resource adapter is deployed in a partition, connector container should pass its partition ID while creating WorkManager instance, so that partition-specific Work Manager configuration is used.

Integration with Security

In accordance with an embodiment, a partition can require partition-specific security configuration for outbound and inbound communication. When setup run-as, manage-as, run-work-as subjects, connector container will pass the partition ID to authentication service. A partition might require partition-specific outbound credential mapping configuration. This configuration can be managed by a security module. The connector container should look up partition-specific mapping through security interface. While setup security context for flow-in message, partition-specific credential mapping should be applied, and the connector container need create CallbackHandler with partition-ID, so that it can authenticate against partition's realm.

Integration with Transaction

In accordance with an embodiment, the connector container can integrate with a transaction API, e.g., Java Transaction API (JTA), to support tenant or partition isolation on transaction. For each partition's connection pool, the connector can register separate XA resource for transaction recovery, and the resource name can be prefixed with a partitionID to keep uniqueness.

@ConnectorResourceDefinition and @AdministeredObjectDefinition Annotation/DD Equivalent Support In accordance with an embodiment, @ConnectorResourceDefinition and @AdministeredObjectDefinition can be used to support defining connector related resource definitions as part of an application. These features can allow for connector resource to be defined in a web module, EJB module, or application deployment descriptor. In a Multi-Tenant environment, these resources can abide by the following isolation rules. If @ConnectorResourceDefinition and @AdministeredObjectDefinition or equivalent DD are defined in domain level application, its related resource adapter should be deployed at domain level. If @ConnectorResourceDefinition and @AdministeredObjectDefinition or equivalent DD are defined in partition level application, its related resource adapter should be deployed in the same partition.

Injection

In accordance with an embodiment, injection points can be resolved correctly in a multi-tenant environment. For example, when a domain-scoped resourced adapter is called by a partition scoped application, a principal can be current caller principal on the thread at the time this instance is used, not when it was injected.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting use of connectors in a multitenant application server environment, comprising:
one or more computers, including an application server that enables deployment and execution of software applications, wherein the application server is associated with a domain configuration that is used at runtime to define a domain for execution of the software applications, and a plurality of partitions,
wherein each of the plurality of partitions is associated with a partition configuration, and wherein each partition provides a subdivision of the domain and includes one or more resource groups of a plurality of resource groups, wherein the one or more resource groups are defined by one or more resource group templates;
one or more deployed partition-level resource adapters, each of the one or more deployed partition-level resource adapters being deployed in a resource group of a partition of the plurality of partitions;
a connector container, wherein the connector container determines a partition scope of the one or more deployed partition-level resource adapters, wherein the partition scope is used to identify a partition identification (partition ID), based on a component invocation context, of a partition of the plurality of partitions within which a partition-level resource adapter is deployed; and
a partition classloader, the partition classloader deploying the one or more deployed partition-level resource adapters, the one or more deployed partition-level resource adapters being an instantiated version of a deployable resource adapter;
wherein, based upon the identified partition ID of partition of the plurality of partitions within which the partition-level resource adapter is deployed, access to the partition-level resource adapter is restricted to applications and resources within the partition associated with the identified partition ID.

2. The system of claim 1, wherein each of the one or more deployed partition-level resource adapters is scoped to their respective partition.

3. The system of claim 2, wherein access to each of the one or more deployed partition-level resource adapters is restricted to their respective partition.

4. The system of claim 1, wherein each of the one or more deployed partition-level resource adapters is scoped to their respective partition.

5. The system of claim 4, wherein access to each of the one or more deployed resource adapters is restricted to their respective partition.

6. The system of claim 1, wherein the application server environment comprises a multi-tenant application server environment, and wherein the system can associate the plurality of partitions with a tenant, for use by the tenant.

7. The system of claim 1, further comprising a domain-level resource group, the domain level resource group comprising a domain-level resource adapter.

8. The system of claim 7, wherein access to the domain-level resource adapter is restricted to applications within the domain.

9. A method for supporting use of connectors in a multitenant application server environment, comprising:
providing, at one or more computers, including an application server that enables deployment and execution of software applications, wherein the application server is associated with a domain configuration that is used at runtime to define a domain for execution of the software applications, a plurality of partitions,
wherein each of the plurality of partitions is associated with a partition configuration, and wherein each partition provides a subdivision of the domain and includes one or more resource groups of a plurality of resource groups, wherein the one or more resource groups are defined by one or more resource group templates;
deploying, by a partition classloader, one or more deployed partition-level resource adapters, each of the one or more deployed partition-level resource adapters being deployed in a resource group at a partition of the plurality of partitions, the one or more deployed partition-level resource adapters being an instantiated version of a deployable resource adapter; and
determining, by a connector container, a partition scope of the one or more deployed partition-level resource adapters, wherein the partition scope is used to identify a partition identification (partition ID), based on a component invocation context, of a partition of the plurality of partitions within which a partition-level resource adapter is deployed;
wherein, based upon the identified partition ID of the partition of the plurality of partitions within which the partition-level resource adapter is deployed, access to the partition-level resource adapter is restricted to applications and resources within the partition associated with the identified partition ID.

10. The method of claim 9, wherein each of the one or more deployed partition-level resource adapters is scoped to their respective partition.

11. The method of claim 10, wherein access to each of the one or more deployed partition-level resource adapters is restricted to their respective partition.

12. The method of claim 9, wherein each of the one or more deployed partition-level resource adapters is scoped to their respective partition.

13. The method of claim 12, wherein access to each of the one or more deployed resource adapters is restricted to their respective partition.

14. The method of claim 9, further comprising:
providing a domain-level resource group, the domain level resource group comprising a domain-level resource adapter.

15. The method of claim 14, wherein access to the domain-level resource adapter is restricted to applications within the domain.

16. A non-transitory computer readable storage medium, including instructions stored thereon for supporting use of connectors in a multitenant application server environment which when read and executed by one or more computers cause the one or more computers to perform steps comprising:
providing, at the one or more computers, including an application server that enables deployment and execution of software applications, wherein the application server is associated with a domain configuration that is used at runtime to define a domain for execution of the software applications, a plurality of partitions, wherein each of the plurality of partitions is associated with a partition configuration, and wherein each partition provides a subdivision of the domain and includes one or more resource groups of a plurality of resource groups, wherein the one or more resource groups are defined by one or more resource group templates;

deploying, by a partition classloader, one or more deployed partition-level resource adapters, each of the one or more deployed partition-level resource adapters being deployed in a resource group at a partition of the plurality of partitions, the one or more deployed partition-level resource adapters being an instantiated version of a deployable resource adapter; and determining, by a connector container, a partition scope of the one or more deployed partition-level resource adapters, wherein the partition scope is used to identify a partition identification (partition ID), based on a component invocation context, of a partition of the plurality of partitions within which a partition-level resource adapter is deployed;

wherein, based upon the identified partition ID of the partition of the plurality of partitions within which the partition-level resource adapter is deployed, access to the partition-level resource adapter is restricted to applications and resources within the partition associated with the identified partition ID.

* * * * *